United States Patent Office 3,407,224
Patented Oct. 22, 1968

3,407,224
ESTER PRODUCTION
Edgar J. Smutny, San Francisco, Calif., assignor to Shell Oil Company, New York, N.Y., a corporation of Delaware
No Drawing. Filed May 14, 1965, Ser. No. 455,978
10 Claims. (Cl. 260—476)

ABSTRACT OF THE DISCLOSURE 2,7-alkadienyl esters, produced by reaction of certain $\alpha,\omega$-conjugated dienes and carboxylic acids in the presence of a platinum, palladium or ruthenium compound as catalyst and a phenoxide anion catalyst promoter.

---

This invention relates to a process for the production of 2,7-alkadienyl carboxylate esters and to novel ester products obtained thereby. More particularly, it relates to the production of diene dimer carboxylates.

Methods are available in the art for the dimerization of conjugated dienes under conditions whereby a derivative of the diene dimer is observed. In general, such methods produce a diene dimer moiety which is branched, for example, from the dimerization of butadiene is typically obtained a methylheptadiene moiety as the principal acyclic product type. General methods of producing diene dimer derivatives wherein the diene moieties have dimerized in a linear manner have not been available.

It is an object of the present invention to provide a method for the production of 2,7-alkadienyl carboxylate esters of organic carboxylic acids, and the novel products produced thereby. A more particular object is to provide an improved process for the production of carboxylate ester derivatives of conjugated diene dimers wherein the diene dimer moiety is produced by diene dimerization in a linear manner. Further objects are to provide a novel class of 2,7-octadienyl carboxylates and an improved method for the production thereof.

It has now been found that these objects are accomplished by the process of reacting organic carboxylic acids with conjugated alkadienes in the presence of certain metal compounds as catalyst and a phenoxide anion catalyst promoter. Although the mechanism of the condensation process is not completely understood, the process of the invention results in the efficient production of esters, the acid moiety of which is derived from the organic carboxylic acid reactant and the alcohol moiety of which may be considered as derived from a dimer of the diene reactant. By way of illustration, from the reaction of acetic acid and butadiene in the process of the invention is obtained 1-acetoxy-2,7-octadiene, alternatively termed 2,7-octadienyl acetate.

The conjugated diene employed as a reactant in the process of the invention is an $\alpha,\omega$-conjugated alkadiene having only hydrogen substituents on the terminal carbon atoms of the four-carbon chain. Dienes that possess non-hydrogen substituents on the internal, i.e., non-terminal, carbon atoms are suitably employed, provided that the internal-carbon atom substituents do not unduly sterically hinder the diene dimerization. A preferred class of diene reactants comprises butadiene having from 0 to 2 internal-carbon methyl substituents. These diene compounds are butadiene, isoprene and 2,3-dimethylbutadiene. Of these, butadiene is particularly preferred.

The process of the present invention is broadly applicable to a wide variety of compounds incorporating within their structure at least one carboxy group, i.e., a —$CO_2H$ group, which compounds are herein termed carboxylic acids. The process is suitably employed with organic carboxylic acids of quite complex or of comparatively simple structure. Best results are obtained when a carboxylic acid of relatively simple structure is employed, and a preferred class of organic carboxylic acids comprises carboxylic acids of up to 20 carbon atoms and having from 1 to 4 carboxy groups, preferably 1 to 2 carboxy groups, present within the molecular structure and having no active hydrogen atoms other than that (those) of the carboxy group(s). The organic carboxylic acid reactant is suitably wholly aliphatic in character, wholly aromatic in character or incorporates both aliphatic and aromatic moieties; however, the carboxylic acid reactant is free of carbon-carbon unsaturation other than that of any aromatic moieties present within the molecule, that is, the carboxylic acid reactant is free of non-aromatic carbon-carbon unsaturation. Expressed in alternate terms, the carboxylic acid reactant has only aromatic carbon-carbon unsaturation, that is, any carbon-carbon unsaturation present within the reactant molecule is aromatic carbon-carbon unsaturation. The carboxylic acid reactant is a hydrocarbon carboxylic acid containing only atoms of carbon and hydrogen besides the oxygens of the carboxy group(s) present, or is a substituted-hydrocarbon carboxylic acid containing, in addition to atoms of carbon, hydrogen and carboxy oxygen, atoms of halogen, particularly halogen of atomic number of from 17 to 35, i.e., the middle halogens chlorine and bromine, oxygen atoms other than carboxy oxygen atoms, and nitrogen, which additional atoms are present in functional groups such as oxy, keto, carbonyloxy, halo, tertiary amino and like groups.

Illustrative of suitable carboxylic acid reactants are wholly aliphatic carboxylic acids including hydrocarbon aliphatic carboxylic acids, both acyclic and cyclic, such as formic acid, acetic acid, butyric acid, 2-ethylhexanoic acid, dodecanoic acid, glutaric acid, adipic acid, hexadecadioic acid, 2-methylglutaric acid, oxalic acid, cyclopentanecarboxylic acid, tetrahydronaphthalene-1-carboxylic acid, 1,4-dicarboxycyclohexane, 1,2,4,5-tetracarboxycyclohexane, 2-(carboxymethyl)glutaric acid and 1,4-bis-(carboxymethyl)cyclohexane; as well as substituted-hydrocarbon aliphatic carboxylic acids, both acyclic and cyclic, as exemplified by chloroacetic acid, trichloroacetic acid, 3-acetoxypropionic acid, 4-bromocyclohexane-carboxylic acid, N-methylpiperidine-2-carboxylic acid, 2-ethoxyethanoic acid, 2,2-dichloropropionic acid, 6-dimethylaminohexanoic acid, 4-chloro-3-methoxybutyric acid, 2,3-dichlorobutandioic acid, 3-chloromethylcyclopentane-carboxylic acid, tetrahydropyran-2-carboxylic acid, bis(2-carboxyethyl) ether and 2-trichloromethylsuccinic acid.

Also suitable are carboxylic acid reactants which are wholly aromatic in character, both alicyclic and heterocyclic, as illustrated by hydrocarbon aromatic carboxylic acids such as benzoic acid, terephthalic acid, phthalic acid, naphthalene-1-carboxylic acid, pyromellitic acid, naphthalene-1,4-dicarboxylic acid and the like, as well as wholly aromatic substituted-hydrocarbon carboxylic acids including p-chlorobenzoic acid, pyridine-2-carboxylic acid, m-bromobenzoic acid, 4-chlorophthalic acid, 4,6-dibromonaphthalene-2-carboxylic acid, 2 - carboxyquinoline and bis(4-carboxyphenyl)ether.

Carboxylic acids having both aromatic and aliphatic moieties are also suitably employed as reactants in the process of the invention. Such acids are exemplified by hydrocarbon carboxylic acids including phenylacetic acid, p-tert-butylbenzoic acid, m-toluic acid, 2,2-bis(4-carboxyphenyl)propane, tetrahydronaphthalene-2-carboxylic acid, p-octylbenzoic acid, 4-(p-tolyl)butyric acid, 4,4'-dicarboxy-2,2'-diethylbiphenyl,3,5-dimethylbenzoic acid and 5-methylisophthalic acid; as well as by substituted-hydrocarbon carboxylic acids, for example, p-trichloromethylbenzoic acid, m-dimethylaminobenzoic acid, 2-(p-chlorophenyl)maleic acid, 3-phenoxypropionic acid, bis(4-carboxyphenylmethyl) ether, p-(benzoyloxy)phenylacetic acid, m-perchloroethylbenzoic acid, 2,3-dibromoterephthalic acid and the like.

In general, carboxylic acid reactants which are hydrocarbon carboxylic acids as above defined or additionally have present atoms of halogen, particularly up to 4 atoms of halogen of atomic number from 17 to 35 inclusive, are preferred over carboxylic acids with other functional groups. Such carboxylic acid reactants are generically termed (halo)hydrocarbon carboxylic acids, which term refers to carboxylic acids having only atoms of carbon, hydrogen, halogen and carboxylic oxygen. Furthermore, the process of the invention is particularly useful when monocarboxylic acids are employed, particularly hydrocarbon monocarboxylic acids of up to 12 carbon atoms. The class comprising acetic acid and benzoic acid is particularly preferred.

The optimum ratio of carboxylic acid reactant to conjugated diene reactant will depend in part upon the functionality of the carboxylic acid reactant, that is, the number of carboxy groups present in the carboxylic acid reactant molecule, as well as the reactant conversion that is desired. Ratios of moles of diene to moles of carboxy group as low as about 1:4 are suitable if only a low conversion is employed. However, to obtain higher conversions, a more substantial proportion of diene is preferred and ratios of moles of diene to moles of carboxy group from 1:1 to about 10:1 are more satisfactory, with best results being obtained when ratios of moles of diene to moles of carboxy group from about 2:1 to about 6:1 are utilized. It should be understood that it is within the contemplated scope of the invention to esterify each carboxy group of the carboxylic acid reactant or only a portion of the total number of carboxy groups. In the latter instance, such restrictive esterification is favored by a molar reactant ratio relatively low in the diene reactant.

The catalyst employed in the process of the invention is a metal compound wherein the metal is selected from palladium, platinum and ruthenium. Particularly preferred as catalyst is a compound of a VIII-C metal having an atomic number from 46 to 78 inclusive, i.e., palladium and platinum. Most preferred as catalyst is a compound of palladium. Without wishing to be bound by any particular theory, it appears that the chemical transformations during the course of the reaction which involve the metal compound are quite complex, probably involving the formation and destruction of complexes between the metal moiety and the diene reactant and/or the presumed diene dimer intermediate. Metal compounds that are soluble in the reaction medium as well as compounds that are superficially insoluble in the reaction system are operable, apparently in the latter case through dissolved metal compound moieties, the formation of which is probably influenced by interaction with the diene reactant and/or the carboxylic acid reactant and the solubilization resulting therefrom. To obtain optimum reaction rates, the metallic compound is preferably soluble in the reaction mixture or serves as a precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium, platinum or ruthenium salts of organic or inorganic acids which are strong or weak acids are suitable. When the metal-containing catalyst is provided as a salt, best results are obtained through utilization of a metal halide, e.g., platinum chloride, platinum bromide, palladium chloride, palladium iodide, ruthenium chloride, ruthenium bromide and the like, and particularly suitable results are obtained when metal chlorides are employed. Also suitable are salts wherein the metal is present in the anion, as for example in the case of palladium, the use of a chloropallidate salt is satisfactory, particularly an alkali metal pallidate, e.g., sodium chloropallidate.

In an alternate modification of the process, the catalyst is provided in the form of a metal complex. Employing palladium for purposes of illustration, one type of suitable complex is a complex of palladium salt and organic ligand, such as is represented by the formula $$L_2PdX_2$$

wherein X is halogen, preferably chlorine, and L is a tertiary nitrogen-containing ligand complexed with the palladium through the nitrogen moiety thereof. Illustrative of such L groups are nitriles both aromatic and aliphatic, such as benzonitrile, propionitrile, acetonitrile, toluonitrile and the like; heterocyclic tertiary nitrogen compounds such as pyridine, quinoline, isoquinoline, picoline and lutidine; and tertiary aliphatic amines such as triethylamine, tributylamine, and dimethylhexylamine.

An equally suitable type of palladium complex is a π-allyl complex of palladium. The simplest member of this class is a π-allyl palladium salt which, when the anion is chlorine, is represented by the following formula

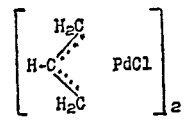

The preparation of this complex and related complexes is described by Huttel et al., Angew. Chemie, 71, 456 (1959). Other illustrative π-allyl complexes are represented by the formula

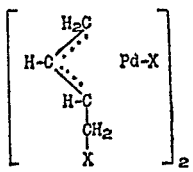

wherein X is halogen, which complexes are conveniently prepared by reaction of diene, e.g., butadiene or isoprene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and ruthenium are also suitable as catalysts in the process of the invention, although as previously stated, palladium-containing catalysts are generally to be preferred.

In an additional modification of the process of the invention, the metal-containing catalyst is provided in the form of a commercial supported elemental metal catalyst. Although the apparent oxidation state of the metal in such supported catalysts is zero, which elemental metal is not soluble in the reaction mixture and therefore does not act directly as a catalyst, sufficient metallic species of ionic character are present as impurities in commercial "metal (O)" catalysts so as to enable such as catalyst to be employed as a source of metal compound.

It is considered that in each above case the palladium or platinum is added as palladium (II) or platinum (II) compound and the ruthenium is added as ruthenium (III) compound, which compounds serve as catalyst or catalyst precursor in the process of the invention. Largely for reasons of convenience and economy, the preferred metal-containing catalyst is palladium chloride.

The process of the invention is characterized by the requirement for only catalytic quantities of platinum, palladium or ruthenium compound. Although utilization of larger amounts of metal-containing catalyst are not detrimental to the process of the invention, amounts larger than about 1% mole based on total reactants are not generally required. Amounts of metal compound less than about 0.001% mole on the same basis are generally unsuitable because of the inevitable physical losses of catalyst during reaction and processing. In general, amounts of catalyst from about 0.01% mole to about 0.5% mole based on total reactants are satisfactory and are preferred.

Although in certain applications the metal compound alone serves as an effective catalyst, the activity of the metal compound is greatly enhanced by the presence within the reaction system of a phenoxide anion catalyst promoter. By the term "phenoxide anion" is meant the anion illustratively obtained by removal of the hydrogen of at least one phenolic hydroxyl group of a phenol, i.e., a compound having at least one hydroxyl group attached to a carbon atom which is a member of an aromatic ring. The structure of the phenoxide anion is not critical, and phenoxide anions analogous to phenols having up to 20 carbon atoms and from 1 to 4 phenolic hydroxyl groups are suitably utilized as catalyst promoter. In the case of a polyhydric phenol, any anion derivable therefrom by removal of the hydrogen(s) from one or all of the phenolic hydroxyl groups present is suitable. For example, in the case of a dihydric phenol, either the mono-anion or the di-anion corresponding thereto may be used as catalyst promoter. Largely for reasons of convenience and economy, it is generally desirable to employ a phenoxide anion of relatively simple structure. Preferred phenoxide anion catalyst promoters are those anions which may be considered to be derived from monohydric mononuclear phenols of up to 10 carbon atoms, which are free from carbon-carbon unsaturation other than that of the aromatic ring, and are hydrocarbon phenols containing only atoms of carbon and hydrogen besides the oxygen of the phenolic hydroxyl group, or are halohydrocarbon phenols additionally having atoms of halogen, particularly halogen of atomic number from 17 to 35. These monohydric, mononuclear phenols are generically designated (halo)hydrocarbon phenols and are preferably (halo)hydrocarbon phenols of up to 10 carbon atoms and of up to 4 atoms of halogen of atomic number from 17 to 35, particularly chlorine. The phenoxide anion corresponding structurally thereto is therefore a mononuclear (halo)hydrocarbon phenoxide mono-anion of up to 10 carbon atoms and of up to 4 halogen atoms as above defined. In the case of the analogous phenols, illustrative phenols include phenol, the cresols, p-ethylphenol, m-chlorophenol, 2,4-dimethylphenol, 3,5-dibromophenol, p-tert-butylphenol and 3,4,5-trimethylphenol. Particularly suitable as the phenoxide anion catalyst promoter is the phenate anion, i.e., the anion corresponding structurally to that moiety produced by removal of the hydroxylic hydrogen of phenol.

The presence of phenoxide anion may be brought about by any convenient method. In the preferred modification of the process of the invention, phenoxide anion is added as a preformed material, customarily in the form of a soluble metal salt of a phenol. Suitable metal salts include alkali metal phenoxides, particularly sodium phenoxides, which are conveniently prepared by neutralization of a phenol with an alkali metal base, for example, an alkali metal hydroxide such as sodium hydroxide, or by direct reaction of the phenol with alkali metal.

The role of the phenoxide anion in the process of the invention is not completely understood. Without wishing to be bound by any particular theory, it appears probable that the phenoxide anion serves as a metal-bound ligand in metal-diene complexes which are possible intermediate species in the formation of the alkadienyl esters of the invention. The phenoxide anion is desirably present in molar amounts that are equal to or greater than the molar amount of metal-containing catalyst compound. Molar ratios of phenoxide anion to metal compound from about 1:1 to about 8:1 are satisfactory, although molar ratios from about 1:1 to about 4:1 are preferred.

The process of the invention is typically conducted by charging the reactants, catalyst and catalyst promoter to an autoclave or similar reactor and maintaining the reaction mixture at reaction temperature until reaction is complete. The method of mixing is not critical although it is generally preferred to mix the reactants and add the catalyst and catalyst promoter thereto. The reaction is suitably conducted throughout a wide range of reaction temperatures and pressures, so long as the reactants are maintained substantially in the liquid phase. Reaction temperatures from about −20° C. to about 150° C. are satisfactory, although temperatures from about 0° C. to about 130° C. are preferred and best results are obtained when a temperature from about 80° C. to about 125° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants, catalyst and catalyst promoter, and are inert to the reactants and the products prepared therefrom. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform; sulfoxides such as dimethylsulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferable to conduct the reaction in the absence of added solvent whenever the physical characteristics of the system at reaction temperature, particularly the melting point thereof, will allow. For example, when the process of the invention is employed with a reaction mixture normally liquid at reaction temperature, the process is typically conducted in the absence of solvent. Alternatively, if the reaction mixture is unduly viscous or normally solid at the reaction temperature, solvent is preferably employed to maintain the reactants in the liquid phase.

Subsequent to reaction, the reaction mixture is separated and the desired product recovered by conventional means such as selective extraction, fractional distillation and chromatographic techniques.

The products of the invention are alkadienyl carboxylate esters illustratively produced by dimerization of the diene reactant and reaction of the diene dimer with the carboxylic acid reactant to esterify at least one of the carboxy groups. In terms of the carboxylic acid reactants as previously defined, the products of the invention are alkadienyl carboxylates wherein the alkadienyl moiety is 2,7-octadienyl or methyl-substituted 2,7-octadienyl depending upon the particular alkadiene reactant employed, and the carboxylic acid moiety is that moiety illustratively obtained by removal of the hydrogen of at least one carboxy group of a carboxylic acid of up to 20 carbon atoms and having from 1 to 4 carboxyl groups. The octadienyl moiety will have from 0 to 4 methyl substituents depending upon the degree of methyl substitution on the diene reactant. When butadiene is employed as the diene reactant, the alkadienyl moiety will be 2,7-octadienyl. Alternatively, when the diene reactant is isoprene, the alkadienyl moiety is principally 3,7-dimethyl-2,7 - octadienyl and/or 3,6-dimethyl-2,7-octadienyl and when 2,3-dimethylbutadiene is the diene reactant the alkadienyl moiety is 2,3,6,7-tetramethyl-2,7-octadienyl.

Generically these alkadienyl moieties are represented by the formula

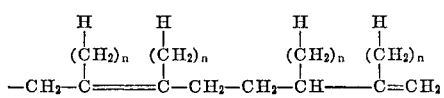

wherein $n$ independently is a whole number from 0 to 1 inclusive. It is within the contemplated scope of the invention to esterify only a portion of the carboxyl groups present in the carboxylic acid reactant, for example, to esterify only one carboxyl group of dicarboxylic acid. However, the preferred products of the invention are those wherein each carboxyl group has been esterified with an alkadienyl moiety as previously defined.

It will be apparent that a wide variety of alkadienyl carboxylates can be prepared by the process of the present invention by varying the carboxylic acid and the diene reactants. Illustrative of these products are 2,7-octadienyl acetate prepared from acetic acid and butadiene, 3,5-dimethyl-2,7-octadienyl benzoate and 3,7-dimethyl-2,7-octadienyl benzoate prepared from benzoic acid and isoprene, 2,3,6,7-tetramethyl-2,7-octadienyl butyrate prepared from 2,3-dimethylbutadiene and butyric acid, as well as other illustrative products such as bis(2,7-octadienyl) phthalate, bis(3,6-dimethyl-2,7-octadienyl) 2-methylglutarate, 2,7-octadienyl cyclohexanecarboxylate, 3,7-dimethyl-2,7-octadienyl 2-naphthoate, 2,7-octadienyl 4-(chlorophenyl)hexanoate, bis(2,3,6,7-tetramethyl - 2,7 - octadienyl) 4,4'-biphenyl-dicarboxylate, 2,7-octadienyl 3-carboxypropionate, 2,7-octadienyl 3,4,5-trichlorobenzoate, bis(2,7-octadienyl) adipate, 3,7-dimethyl-2,7-octadienyl pyridine-2-carboxylate, 2,7-octadienyl ethoxyacetate, 2,7-octadienyl 2,4-diethylbenzoate, 2,7-octadienyl p-tert-butylbenzoate, 2,3,6,7-tetramethyl-2,7-octadienyl phthalate and 2,7-octadienyl trichloroacetate.

The products of the invention are useful in a variety of applications. The remaining ethylenic linkages can be hydrated or hydroxylated to form useful alcohol derivatives from which can be prepared useful esters or ethers. The ethylenic linkage serves as a dienophile in Diels-Alder condensations, or serves as a reactive site for polymerization or co-polymerization processes and additionally the ethylenic linkages are epoxidized to form epoxy compounds from which useful epoxy resins are prepared by reaction with a variety of epoxy curing agents. The ester products are hydrolyzed to form allylic alcohols from which ethers, sulfates, sulfonates and the like are prepared.

To further illustrate the process of the invention and the novel products obtained thereby, the following examples are provided. It should be understood that the details thereof are not to be regarded as limitations, as they may be varied as will be understood by one skilled in this art.

Example I

To a stainless steel bomb were charged 0.5 mole of acetic acid, 1.6 moles of butadiene, 1 g. of palladium chloride and 2 g. of sodium phenate. The bomb was sealed and maintained at 100° C. for 22 hours. The bomb was then cooled and opened and the product mixture removed and filtered. Gas-liquid chromatographic analysis of the product mixture indicated the yield of 2,7-octadienyl acetate, B.P. 70–86° C. at 2 mm., was approximately 45% based upon a 37% conversion of the acetic acid. The 2,7-octadienyl acetate was isolated by preparative gas-liquid chromatographic techniques and the structure was confirmed by analysis, molecular weight and the consistency of the nuclear magnetic resonance spectrum with the above formula. The analysis of the product was the following:

Analysis.—Calc.: C, percent wt. 71.3; H, percent wt. 9.6; Molec. wt. 168. Found: C, percent wt. 71.3; H, percent wt. 9.5; Molec. wt. 152±6.

Similar results are obtained when platinum chloride is employed as catalyst in place of the palladium chloride of the above example.

Example II

To a stainless steel bomb were charged 0.4 mole benzoic acid, 1.1 moles of butadiene, 1.0 g. palladium chloride, 2.0 g. of sodium phenate and 50 ml. of chloroform which served to dissolve the reactants. The reaction mixture was maintained at 100° C. for 22 hours. The resulting product mixture was filtered and the components thereof were separated by distillation and gas-liquid chromatographic techniques. The conversion of benzoic acid was found to be 97% and the yield of 2,7-octadienyl benzoate based thereon was approximately 28%. The structure of the product was confirmed on the basis of analysis and the infrared and nuclear magnetic resonance spectra. The analysis of the product was the following:

Analysis.—Calcd.: C, percent wt. 78.2; H, percent wt. 7.9. Found: C, percent wt. 77.5; H, percent wt. 7.9.

When the above experiment is repeated employing isoprene as the conjugated diene reactant, a good yield of dimethyl-2,7-octadienyl benzoate is obtained which comprises principally 3,6-dimethyl-2,7-octadienyl benzoate and 3,7-dimethyl-2,7-octadieneyl benzoate.

Example III

When the procedure of Example II is followed to react p-chlorobenzoic acid and 2,3-dimethylbutadiene in the presence of π-allyl palladium chloride as catalyst and sodium p-chlorophenoxide as catalyst promoter in acetonitrile solution, a good yield of 2,3,6,7-tetramethyl-2,7-octadienyl p-chlorobenzoate is obtained.

Example IV

Employing the procedure of Example II, a good yield of 2,7-octadienyl adipate and bis(2,7-octadienyl) adipate is obtained when adipic acid is reacted with butadiene in tetrahydrofuran solution in the presence of palladium chloride and sodium phenate.

Example V

When a procedure similar to that of Example I is employed to react propionic acid with butadiene in the presence of ruthenium chloride and sodium p-ethylphenoxide, a good yield of 2,7-octadienyl propionate is observed.

Example VI

When p-tert-butylbenzoic acid is reacted with butadiene in chloroform solution in the presence of platinum chloride and sodium phenate according to the procedure of Example II, a good yield of 2,7-octadienyl p-tert-butylbenzoate is obtained.

I claim as my invention:

1. The process of producing alkadienyl carboxylate esters by contacting (a) a carboxylic acid of up to 20 carbon atoms, from 1 to 2 carboxy groups, having no active hydrogen atoms not present in carboxyl groups and being free from non-aromatic carbon-carbon unsaturation selected from hydrocarbon acyclic aliphatic carboxylic acids, halohydrocarbon acyclic aliphatic carboxylic acids of up to 4 halogen atoms of atomic number from 17 to 35 inclusive, hydrocarbon aromatic carboxylic acids and halohydrocarbon atomatic carboxylic acids of up to 4 halogen atoms of atomic number from 17 to 35 inclusive, with (b) from about 0.25 mole to about 10 moles per mole of carboxy group of conjugated diene selected from butadiene, isoprene and 2,3-dimethylbutadiene, in the presence of from about 0.001% mole to about 1% mole based on total reactants of a soluble metal compound as catalyst wherein the metal is palladium, platinum or ruthenium, and from about 1 mole to about 8 moles per mole of said catalyst of phenoxide anion catalyst promoter, said phenoxide anion corresponding to that moiety produced by removal of at least one hydroxylic hydrogen of a phenol selected from monohydric phenols and dihydric phenols of up to 20 carbon atoms, in the liquid phase at a temperature from about −20° C. to about 150° C.

2. The process of producing alkadienyl carboxylate esters by contacting (a) hydrocarbon carboxylic acid of up to 12 carbon atoms, from 1 to 2 carboxy groups, having no active hydrogen atoms not present in carboxy groups and being free from non-aromatic carbon-carbon unsaturation selected from hydrocarbon acyclic aliphatic carboxylic acids and hydrocarbon aromatic carboxylic acids, with (b) from about 0.25 mole to about 10 moles per mole of carboxy group of conjugated diene selected from butadiene, isoprene and 2,3-dimethylbutadiene, in the presence of from about 0.001% mole to about 1% mole based on total reactants of a soluble metal compound as catalyst wherein the metal is palladium or platinum and from about 1 mole to about 8 moles per mole of said catalyst of phenoxide anion catalyst promoter selected from hydrocarbon phenoxide mono-anion of up to 10 carbon atoms and halohydrocarbon phenoxide mono-anion of up to 10 carbon atoms and up to 4 halogen atoms, said halogens being selected from chlorine and bromine.

3. The process of claim 2 wherein the carboxylic acid is a monocarboxylic acid, the conjugated diene is butadiene, the catalyst is palladium chloride, the phenoxide anion is provided as sodium phenate and the temperature of said contacting is from about 0° C. to about 130° C.

4. The process of claim 2 wherein the metal of said metal catalyst is palladium.

5. The process of claim 4 wherein the catalyst promotor is provided as the sodium phenoxide.

6. The process of claim 5 wherein the carboxylic acid is adipic acid.

7. The process of claim 5 wherein the carboxylic acid is selected from acetic acid and benzoic acid.

8. The process of producing 2,7-octadienyl acetate by contacting acetic acid with from about 1 mole to about 10 moles per mole of acetic acid of butadiene, in the presence of from about 0.001% mole to about 1% mole based on total reactants of palladium chloride and from about 1 mole to about 8 moles per mole of palladium chloride of sodium phenate, at a temperature of from about 0° C. to about 130° C.

9. The process of producing 2,7-octadienyl benzoate by contacting benzoic acid with from about 1 mole to about 10 moles per mole of benzoic acid of butadiene, in the presence of from about 0.001% mole to about 1% mole based on total reactants of palladium chloride and from about 1 mole to about 8 moles per mole of palladium chloride of sodium phenate, in liquid-phase solution in inert solvent, at a temperature of from about 0° C. to about 130° C.

10. The compound 2,7-octadienyl p-tert-butylbenzoate.

References Cited

UNITED STATES PATENTS

| | | | |
|---|---|---|---|
| 2,533,938 | 12/1950 | Jenner | 260—488 |
| 2,677,701 | 5/1954 | Surmatis et al. | 260—491 |

LORRAINE A. WEINBERGER, *Primary Examiner.*

T. L. GALLOWAY, *Assistant Examiner.*